Figure 1:
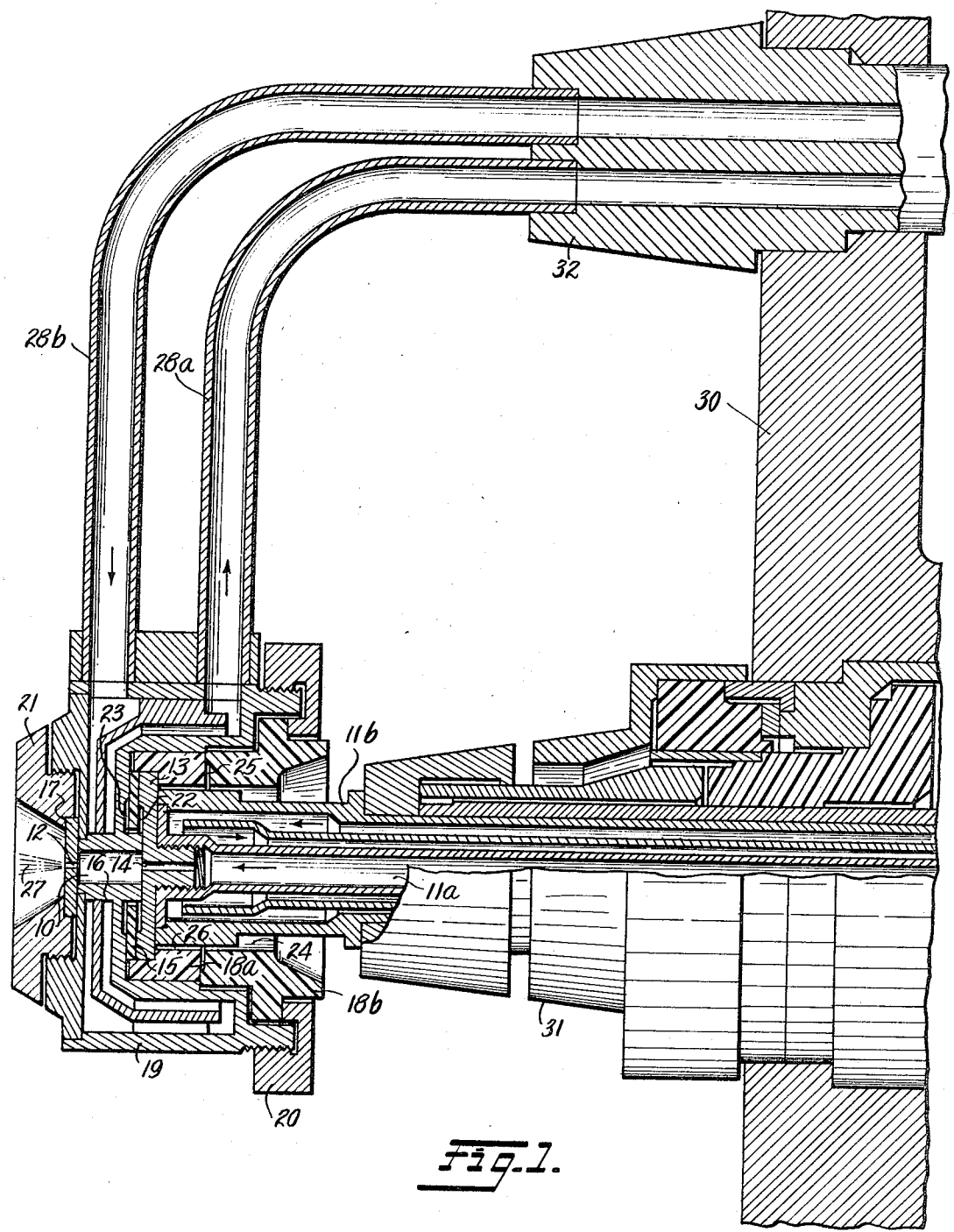

June 6, 1967  B. BERGHAUS  3,324,027
APPARATUS FOR PERFORMING CHEMICAL AND OTHER PROCESSES UNDER
THE ACTION OF GAS IONS
Original Filed Oct. 2, 1958  5 Sheets-Sheet 1

INVENTOR.
BERNHARD BERGHAUS
BY
Bacon & Thomas
ATTORNEYS

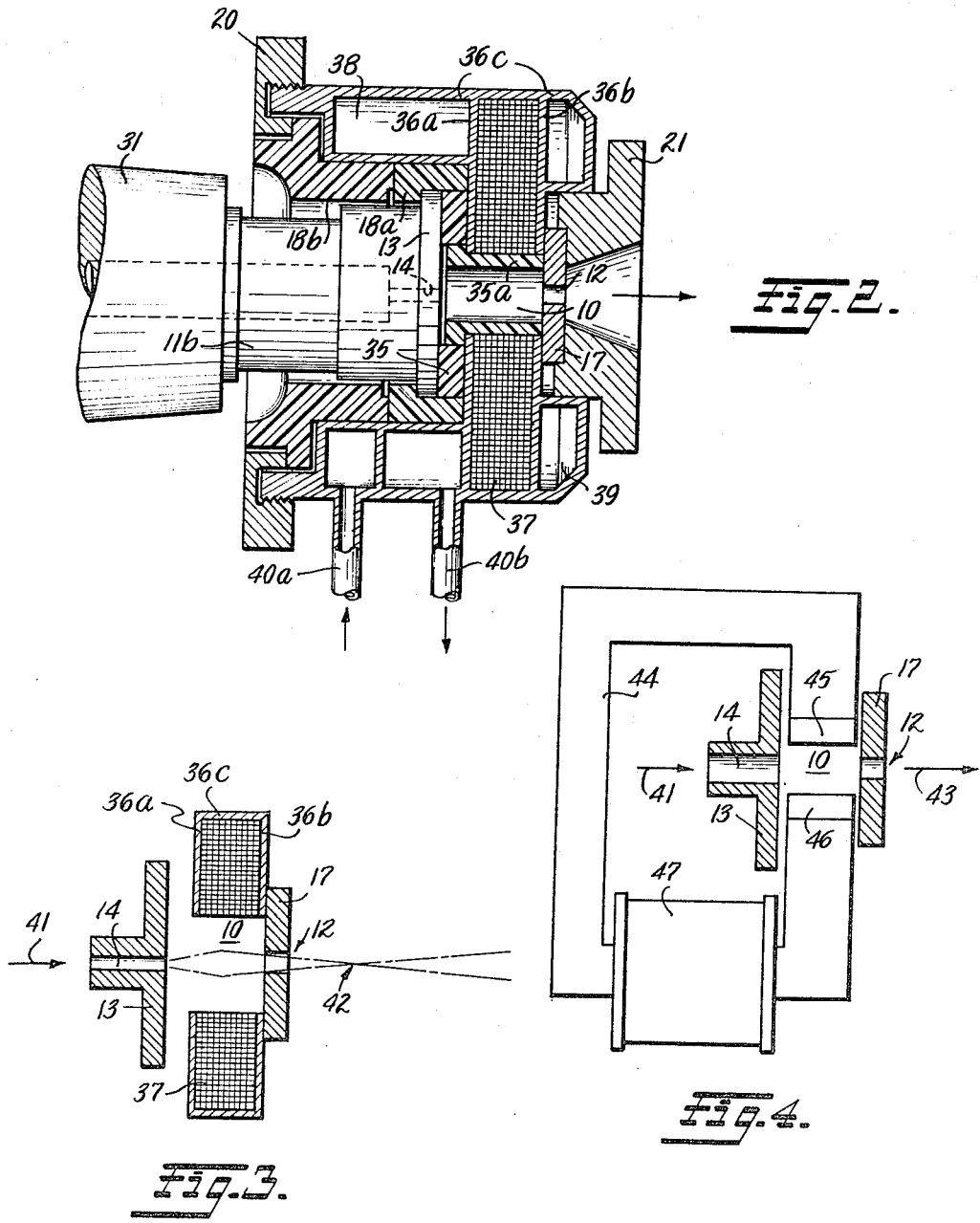

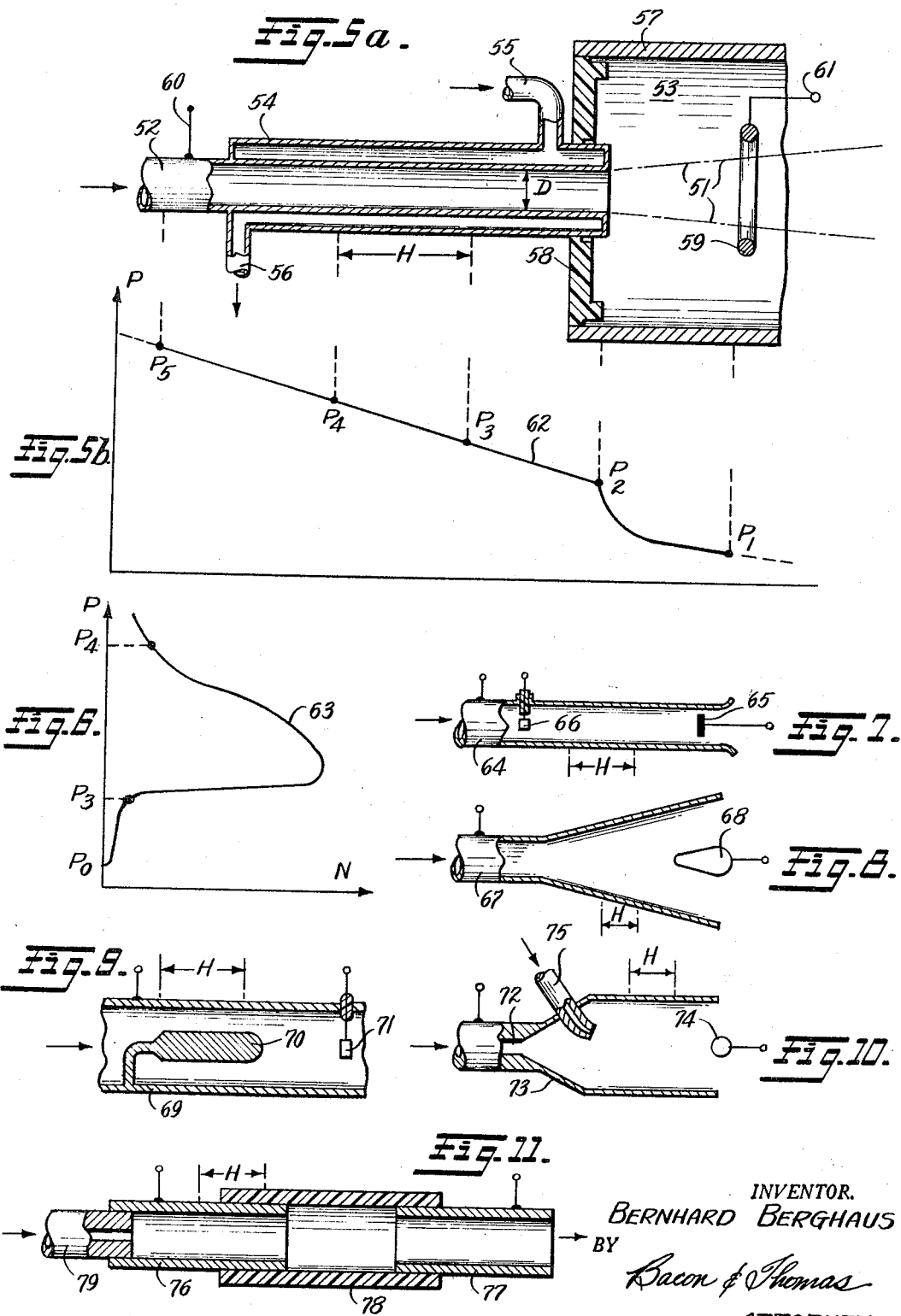

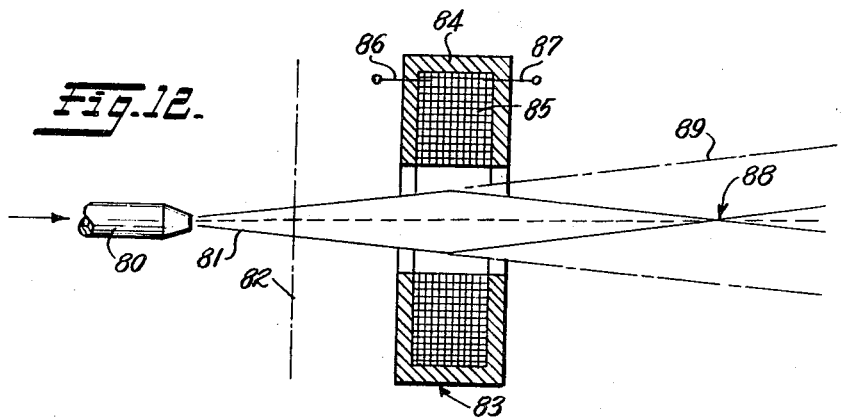
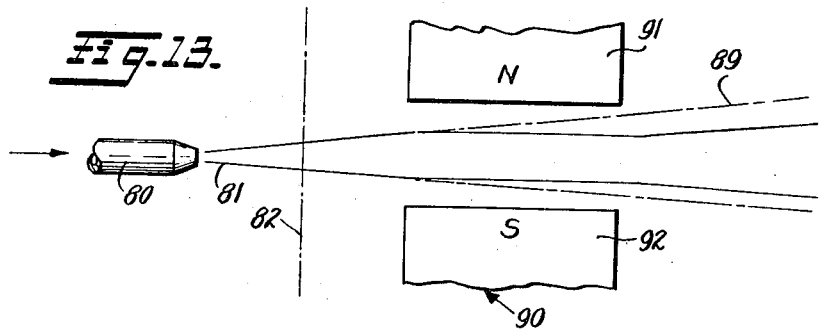
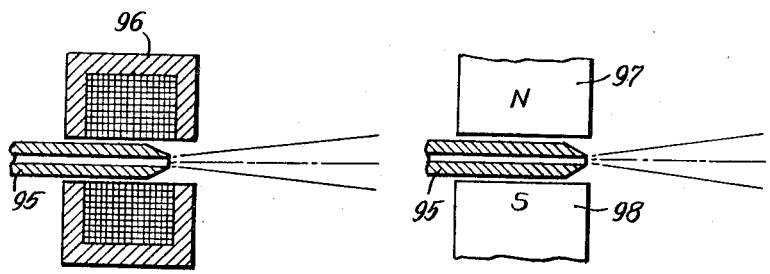

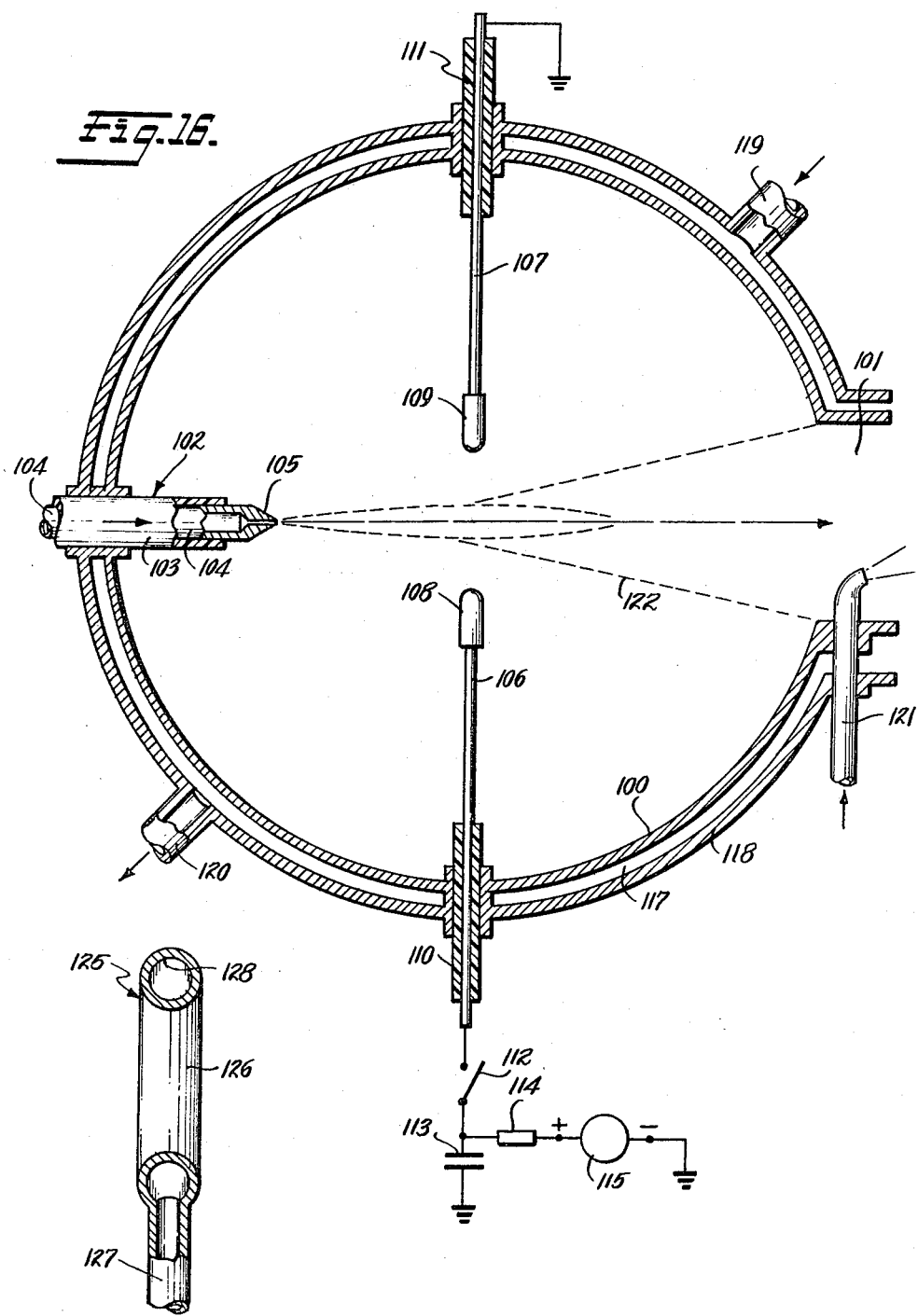

United States Patent Office 3,324,027
Patented June 6, 1967

3,324,027
APPARATUS FOR PERFORMING CHEMICAL AND OTHER PROCESSES UNDER THE ACTION OF GAS IONS
Bernhard Berghaus, Zurich, Switzerland, assignor to Elektrophysikalische Anstalt Bernhard Berghaus, Vaduz, Liechtenstein, a corporation of Liechtenstein
Original application Oct. 2, 1958, Ser. No. 764,990. Divided and this application Nov. 7, 1962, Ser. No. 236,110
5 Claims. (Cl. 204—312)

The present application is a division of copending application Ser. No. 764,990, filed Oct. 2, 1958, now abandoned.

The present invention relates to metallurgical, chemical and other technical processes in which an action of gas ions occurs and which are performed on an industrial scale. The field of application of the method according to this invention for the performance of such processes is beyond the so-called electronic or mainly physical range for which purposes relatively weak ion currents are employed. Devices having relatively weak currents, even if the latter are composed, as in machines for the acceleration of particles, of ions having a high kinetic energy, require a substantially different type of arrangement than industrially applicable units for operation with strong ion currents.

Methods have existed for a long time in which strong ion currents are operative, such as in metallurgical arc processes. It has also been proposed to produce an arc within a fully enclosed pressure chamber provided with a narrow nozzle-type bore in an electrode, to maintain a gas pressure of several hundred atmospheres in the said pressure chamber by supplying gas, and to produce a highly ionized gas jet which emerges from the bore. Such a gas jet ionized by a high-pressure arc may possess a very high temperature and it consists of a more or less dense plasma of gas ions. In accordance with the largely thermal ionization of such a gas jet, the latter is composed of positively and negatively charged particles in approximately equal number. While such gas plasma jets may be employed to generate high tempertaures of up to 100,000° C., they display properties undesirable for many purposes since the presence of positive and negative charge carriers renders difficult the control of the plasma jet by exterior electric and magnetic fields.

The method according to this invention for the performance of the said technical processes under the action of ions is characterized by the fact that an ionized gas jet is employed in which charge carriers of one polarity are continuously concentrated.

For electronic and physical purposes there exist various devices, commonly described as ion sources, for the generation of an ion current comprising unipolarized gas ions. Such ion sources are, however, designed for relatively weak ion currents only and base on the principle that ions are first formed in a stationary gas atmosphere, then accelerated by means of electric or magnetic agencies and transformed into a flow of such unipolar charge carriers. Accordingly, that is not a gas flow which is ionized and has one type of charge carrier concentrated.

Other proposals regarding a source of ions have been made in which a gas jet, which enters an evacuated space through a nozzle, is ionized. The ions are deflected from the gas jet by electrical or magnetic means, and employed for the purpose desired, e.g. passed into an accelerating chamber, while the gas jet free of ions is exhausted by the pump unit. This, too, has nothing to do with the method according to the present invention of concentrating charge carriers of a single polarity in a gas jet.

A number of embodiments are described in greater detail in conjunction with the attached drawing, in which
FIG. 1 is a longitudinal section of an embodiment of a nozzle-type device arranged in the cover of a reaction vessel for the purpose of performing the method according to this invention;
FIG. 2 is a longitudinal section of a further embodiment similar to that of FIG. 1 having a magnet coil;
FIGS. 3 and 4 are both diagrammatic representations of the magnetic control of a gas jet;
FIGS. 5a, 5b are a longitudinal section and a pressure diagram respectively of a further embodiment of a method according to the invention;
FIG. 6 is a diagram of the output N at pressure P in a device according to FIG. 5a;
FIGS. 7 through 11 are longitudinal sections of further embodiments of the devices according to the invention;
FIGS. 12 through 15 are diagrammatic views of means for the magnetic influencing of ionized gas jets;
FIG. 16 is a longitudinal section of a further device according to this invention, and
FIG. 17 is a longitudinal section of an auxiliary electrode for the device according to FIG. 16.

In the present method, the concentration of charge carriers of a single polarity in a gas jet may be obtained by various means. It is assumed that the gas jet emerges from one or several nozzle-type members and that concentration is effected within the said members.

An embodiment of such a nozzle-type member is shown in longitudinal section in FIG. 1. The device shown comprises a reaction chamber 10 through which a gas jet is passed which enters through tube connection 11a and emerges through the nozzle-type opening 12. The reaction chamber 10 is fully enclosed by walls; at the top, by the plate 13 having the inlet opening 14; laterally, by the sleeve 16, and at the bottom, by the nozzle plate 17 with the nozzle-type opening 12. The insulating plate 15 electrically insulates the plate 13 relative to the sleeve 16. The plate 13 is forced against the insulating plate 15, via the insulating rings 18a and 18b, by the nut 20 screwed into the cylindrical double-walled extension of the sleeve 16. The said insulating plate 15 rests on the horizontal bottom of the extension 19. The nozzle disc 17, too, is forced against the cathode sleeve 16 and the extension 19 by a nut 21.

The sleeve 16 is preferably operated as the cathode, and the plate 13 as the anode, but the device is not limited to this mode of operation.

Provided opposite the anode plate 13 and opposite the cathode sleeve 16 and the tube connection 19 respectively on either side of the insulating plate 15 is an annular slot 22 and 23 designed to render difficult the penetration of the glow discharge along the surface of the insulating plate.

The exterior tube 11b attached to the anode plate 13 and its outer wall also form an annular slot 24 together with the inner wall of the insulating ring 18a, the said slot opening into the flat transverse slot 25 provided between the insulating rings 18a, 18b and continuing in the annular slot 26 between the outer tube 11b and the insulating ring 18b. This gap system of known design is provided to render difficult the penetration of energy-rich glow discharges to the annular slot 26.

The device described extends into the interior of a container and is attached, in gas-tight relationship, to a current lead-in 31 arranged in insulated and gas-tight relationship in its cover 30 and provided with an exterior tube 11b. Via this lead-in and the exterior tube 11b of the anode plate 13, e.g. an anodic potential, and via the space between the exterior tube 11b and the tube connection 11a a coolant is applied while a gas current is supplied through the tube connection 11a. The gas flows into the reaction chamber 10 through the inlet opening 14, and into the interior of the container through the opening 12 in the nozzle plate 17, and forms a gas jet indicated by the dot-dash lines 27.

The cathode sleeve 16 and the extension 17 are in turn connected, via tubes 28a and 28b, to a second current lead-in 32 arranged in the cover 30 in insulated and gastight relationship and are supplied with cathodic potential and a coolant for the double-walled extension 19 and the cathode sleeve 16. Preferably, a liquid coolant is supplied and removed through the current lead-ins 31 and 32 respectively, but a gaseous coolant may also be employed.

Connected with the container is a pumping device which can maintain a gas pressure according to requirements between 1 and 1000 mm. Hg during operation within the said container. The gas supply via the tube connection 11a is at all times effected at an overpressure relative to the interior of the container. The pressure set up in the reaction chamber 10 may accordingly be higher than 1000 mm. Hg and amount to as much as 50 gauge atmospheres and over.

If pure $H_2$ gas is supplied through the tube connection 11a and a direct voltage between approx. 200 and 2000 volts applied to the cathode sleeve 16 depending on the gas pressure, an intensive glow discharge occurs in the reaction chamber 10. The gas flowing through the reaction chamber is accordingly strongly ionized and dissociated into its atomic constituents or transformed into a highly active excited condition. Such a glow discharge between the cathode sleeve 16 and the nozzle plate 13 forming the cathode concentrates the positive gas ions in the gas current within the reaction chamber 10 so that the said gas jet 27 consists mainly of positive gas ions when it leaves nozzle 12.

The device disclosed is suitable particularly for operation at gas pressures in the reaction chamber 10 in excess of 50 mm. Hg to several gauge atmospheres. This is due to the fact that the gas current is directed to the cathode from the anode, which facilitates the generation of a gas or glow discharge at high gas velocities and rising gas pressure.

In order to facilitate starting, a secondary anode, possibly in the shape of a metal ring, can be arranged outside the device described at a greater or lesser distance from the nozzle opening 12. For starting, only this anode may be connected to the voltage source while the current lead-in 31 is disconnected from the voltage source.

The arrangement described is so designed that the parts possibly subject to wear and tear, i.e., the anode plate 13, nozzle plate 17 and also the insulating plate 15 can be replaced with ease. This also enables the pressure in the reaction chamber 10 to be altered relative to the pressure in the container and in the tube connection 11a respectively by suitable selection of the inside diameter of the openings 14 and 12, and the velocity of the gas, i.e., the duration of its passage through the reaction chamber 10, to be influenced.

The device is only an embodiment. The present method may be performed in any device which is provided with a downstream wall in the gas current, which operates as a cathode preferably and at least at certain times, while an electrode, which operates as an anode preferably at lease at certain times, is provided upstream. The gas inlet opening need not necessarily lead through the anodic electrode; the gas may be introduced laterally and tangentially or obliquely arranged gas outlet at the lower boundary of the reaction chamber is possible as well. The lateral enclosure of the reaction chamber may be formed by a sleeve 16 made of an insulating material. If desired, the sleeve-type body 16, 19 may be formed of an insulating material and have the metallic plates 13 and 17 inserted therein.

In the embodiment of the device according to FIG. 1, a nozzle plate 17 of 2 mm. thickness formed of molybdenum and an opening 12 of about 1 sq. mm. cross-sectional area was employed. The reaction chamber has a diameter of 8 mm. and a length to the anode plate 13 of 10 mm. The inlet opening 14 has a clear width of 10 sq. mm. With an argon gas current of about 50 cu. cm./second through the device and a direct voltage of 480 volts between the anode and the cathode, a gas or glow discharge of 1.5 kw. sustained output was maintained. In the emerging gas jet, a high concentration of positive gas ions of at least 60 percent of all gas ions was found to exist. On incresing the power supplied, a percentage of 75 and 90 percent respectively was obtained.

The dimensions of the device disclosed can, however, be entirely different depending on the volume of gas desired to be processed per unit time. In particular, the reaction chamber 10 may be much larger than indicated, and the distance between the anode plate 13 and the nozzle plate 17 may be as much as 100 mm. and more.

Preferably the gas or glow discharge acting on the gas current is supplied by a direct voltage source. A supply by means of wave or impulse voltages may be employed as well.

If ions or charge carriers of negative polarity are desired to be concentrated in the gas jet, the nozzle plate 17 is advantageously operated as the anode and the plate 13 facing it in the reaction chamber 10, as the cathode. Investigations have shown that a glow discharge can be maintained in this type of operation within a certain pressure range in the reaction chamber 10, which discharge will produce a certain number of negative charge carriers. However, so far this has been achieved only at relatively low jet speed.

The concentration of charge carriers having largely but one polarity within the gas jet in the reaction chamber 10 seems to be possible only if the electric field strength within the said chamber does not drop below a certain minimum level. If an electric arc discharge is generated, by way of example, between the anode plate 13 and the cathode plate 17, of which the operating voltage is of a magnitude between 15 and 30 volts, thermal ionization in the gas jet will be prevalent and the gas jet emerging from the opening 12 contains a practically equal number of positive and negative charge carriers. Since the electric field strength in the reaction chamber does not enable the charge carriers to be separated owing to the low potential, one type of charge carriers cannot be concentrated. In order to enable a certain type of charge carriers to be concentrated, the electric field strength in the gas jet would seem to have to be sufficient for the charge carrier velocity $V_F$ obtained thereby to be larger than the velocity of the gas $V_G$ and the mean "thermal" rate $V_T$.

This condition is satisfactorily met by an electric glow dischrage, but other types of discharges, such as brush, spray or corona discharges, may be employed which have an operating potential substantially larger than an arc discharge.

When performing chemical processes with the present method, it may also be advantageous for the nozzle plate 17 and/or the cathode sleeve 16 and/or the anode plate 13 with the nozzle-type member according to FIG. 1 to be formed of a material which can exercise a catalytic effect in finely dispersed atomized particles or as a vapour in the gas jet. Furthermore, for such chemical purposes, the substances participating in the chemical reaction may be supplied, through the tube connection 11a, as gases or as finely dispersed vaporous and/or liquid and/or solid particles in a gaseous reagent or in a carrier gas not participating in the reaction.

FIG. 2 shows a further embodiment of the device similar to that disclosed in FIG. 1, in which parts corresponding to those of FIG. 1 have the same reference numerals. The side walls of the reaction chamber 10, however, are here formed of a tube end 35a of non-magnetic metal or an insulating material supported by iron plates 36a and 36b which extend radially inward from the outer cylindrical iron container 36c. Arranged in the space between the iron plates 36a and 36b is a coil 37. The iron container 36c is provided with two walls and the hollow spaces 38 and 39 are designed for the passage of a coolant supplied by line 40a and drained through line 40b. The nozzle plate 17 here consists of a non-magnetic metal of an insulating material, such as molybdenum or boric nitride.

When energized by means of a direct current, the coil 37 operates as an iron-shielded magnetic lens and therefore exercises, in the known manner, a deflecting effect on the ionized gas flowing from the opening 14 to the nozzle mouth 12.

When this device is operated by means of a discharge formed between the plate 13 operating as the anode and the nozzle plate 17 operating as the cathode, energization of the coil 37 may be such that any negative charge carriers present in the gas current are deflected laterally and prevented from passing through the nozzle opening, which causes the positive charge carriers in the gas jet emerging from the nozzle 12 in direction of the arrow to be concentrated. When the energization of the coil 37 is properly selected, the magnetic field, which is axially symmetrical with the nozzle axis, can additionally constrict and focus the gas jet with unipolar ions within the reaction chamber 10 and within or without the nozzle 12 respectively. This concentration and/or focusing on a space position coaxial with the nozzle axis, which is possible only with a gas jet having ions of a single polarity, enables the charge carrier concentration to be greatly increased in this space portion, an effect which is otherwise obtainable only with very high energies in a plasma. At the same time the gas jet is removed from the walls 35a, which is an advantage with high energies and correspondingly high temperatures within the reaction chamber.

The case of focusing the gas jet containing ions of one polarity outside the nozzle 12 is shown diagrammatically in FIG. 3, only the anode plate 13 with the opening 14, the cathode plate 17 with the opening 12, and the coil 37 with the iron casing 36a, 36b and 36c being shown. The gas jet applied through the opening 14 in the direction of arrow 41 is ionized in one polarity and focused by the magnetic lens 36, 37 in the space portion 42 outside the nozzle opening 42. By screening the negative voltage carriers within chamber 10, the positive charge carriers are concentrated in the gas jet emerging from nozzle 12. Focusing and concentration of the charge carriers of the same, preferably of positive, polarity in the space portion 42 there corresponds to a subtantial increase of energy. If the same energy were to be produced within the chamber 10, a gas or glow discharge several times larger would be required to take place. Focusing of the charge carriers outside the nozzle 12 thus constitutes a relief of the said nozzle and the recation space 10.

A concentration of the charge carriers in the space can be obtained as well when the magnetic field, of which at least portions are parallel with the central axis, in FIG. 3 is replaced by a magnetic field normal to the said axis. This is diagrammatically shown in FIG. 4 which shows only the anode plate 13 with the bore 14 and the nozzle plate 17 with the opening 12 similarly to FIG. 3. In addition, a magnetic yoke 44 formed of iron with the pole shoes 45 and 46 and the energizing coil 47 is provided. Between the pole shoes 45 and 46 a strong magnetic field can be obtained in a direction normal to the gas jet between the inlet opening 14 and the nozzle 12 if the coil 47 is sufficiently energized by direct current. The charge carriers generated in the gas jet by the gas discharge between plate 13 and the nozzle plate 17 will then describe a spiral movement concentric with the central axis under the action of the magnetic field; the diameter of the spiral travelled can be made so small that a concentration of the charge carriers occurs in a space portion of the chamber 10 coaxial with the central axis. This will also enable the ionized gas jet to be removed from the walls of chamber 10, so that the latter is relieved despite the concomitant increase of energy in the compressed gas-ion jet.

Finally it is also possible to overlay strong energy impulses on the electrical stationary gas or glow discharge, which pass between the electrodes 13 and 17 as sparks or other impulse-like discharges. Such intense axial discharges cause the ionized gas jet to be magnetically constricted.

The electro-magnets shown in FIGS. 2 through 4 may also be replaced by permanent magnets.

A further embodiment for the performance of the present method of concentrating charge carriers having one polarity in a gas jet within a member of nozzle-type configuration is made possible by the so-called hollow-cathode effect which is disclosed in detail, by way of example, in the Swiss patent specification No. 314,340 (Berghaus).

FIG. 5a illustrates a suitable device in which the gas current to be ionized is passed through a tubular nozzle 52 in the direction of arrow 50. The said nozzle opens into a closed receptacle 53. The tube 52 carries a cooling jacket 54 with inlet 55 and 56 for a suitable coolant, such as water, and consists of metal. The tube 52 designed as a nozzle duct is not electrically connected with the metal walls 57 of the container 53 owing to the presence of the cover 58 formed of insulating material. Arranged within the receptacle 53 is a counterelectrode 59 which may be insulated in respect of the metal walls 57 or electrically connected therewith. If desired, the counterelectrode may be dispensed with and the metal walls 57 used as the counterelectrode. The receptacle 53 is connected to a suitable pumping device (not shown), which enables a predetermined gas pressure $P_1$ to be maintained during operation. The gas entering tube 52 in the dircetion of arrow 50 emerges into the receptacle 53 as a gas jet. FIG. 5b diagrammatically shows the pressure distribution in the gas jet along the central axis of tube 52 and receptacle 53 respectively during operation. Gas pressure which possesses the value $P_1$ approximately in the plane of the counterelectrode 59, becomes higher when approaching the tube mouth and reaches the value $P_2$ at the tube mouth. As is known, a pressure drop occurs in the gas current within the tube 52 so that the pressure increases when proceeding against the direction of flow as per line 62, and possesses the value $P_5$ at the tube inlet. Selection of initial pressure $P_5$ and terminal pressure $P_1$ enables the pressure gradient $P_5-P_2$ within tube 52 to be adjusted within certain limits determined by the known laws governing flowing gaseous media; it is irrelevant whether the pressure gradient within the tube is linear or otherwise.

If a direct voltage source with a potential adjustable between 200 and 1000 volts has its negative pole connected to the tube connection 60 and its positive pole to the counterelectrode connection 61, a gas or glow discharge can be obtained in the discharge gap formed by the tube mouth and the counterelectrode 59. By way of example $P_1=5$ mm. Hg and $P_2=$approx. 20 mm. Hg while the voltage at the connection 60 and 61 is set at 600 volts. Under these pressure and voltage conditions the tube mouth operating as the cathode is covered by a glow. This glow also lines the inner walls of the tube 52 from the mouth to a depth determined by the inside diameter and the pressure conditions, and ends where owing to the long travel the amount of voltage carriers in the gas becomes too small for the transmission of current to the counterelectrode 59. However, with the pressures indicated and a diameter of $D=5$ mm. of tube 52 a penetration depth will amount to from 50 to 100 mm.

If the tube diameter D possesses a value at which the flow of the discharge at opposite inner tube walls overlaps or becomes continuous at a given pressure range $P_3$ to $P_4$, an intense hollow discharge will occur in this portion of the tube 52. It must naturally be ensured that the transmission of current from this tube section H to the counterelectrode 59 is not too strongly inhibited. With the above examples of pressure and voltage conditions and a tube 52 having a diameter of $D=.7$ mm. such a hollow discharge may be obtained within a pressure range from approx. $P_3=40$ mm. Hg and about $P_4=70$ mm. Hg.

FIG. 6 shows the energy conditions; the transformation of energy N being indicated by line 63 in dependence on pressure P. While a certain pressure $P_3$ obtains where the glows overlap substantially, at which the hollow discharge sets in abruptly, its stoppage at a higher pressure $P_4$ is not so sharply defined. Accordingly, the length of the zone H of higher energy transformation in the tube 52 of the device according to FIG. 1 cannot be clearly defined, while its beginning can be determined.

The receptacle 53 of the embodiment according to FIG. 5a is not essential and may be dispensed with if the counterelectrode 65 is arranged in insulated relationship in the metallic nozzle 64 serving as a cathode, as diagrammatically shown in FIG. 7. The counterelectrode 65 is preferably arranged outside the zone H of higher discharge energy. In principle, the anode may also be located in a section having higher pressure in the tube 64, as the electrode 66 insulatedly built into the tube wall. However, it must always be ensured that the gas jet in the discharge gap can be ionized and that a glow edge with cathode fall space can occur in the tube section H.

If it is desired to concentrate the hollow discharge in the tube on a shorter length, a nozzle of the type illustrated in FIG. 8 may be employed. The tube 67 is flared to form a cone as indicated, or a horn, so that the diameter and pressure conditions for a hollow discharge obtain only in a substantially shorter portion H. Here, too, the flared tube 67 preferably operates as the cathode, and the anode 68 of streamlined design is provided, by way of example, in the lower pressure area.

Furthermore it is also possible, as shown in FIG. 9, to produce the hollow discharge within a predetermined section of a cylindrical nozzle by providing a tube 69 operating as a cathode and arranging concentrically within the said section an inner electrode 70, which carries the same potential. When pressure conditions are suitable, a hollow discharge can occur only in the annular space along the inner electrode 70 if the anode 71 is sufficiently near this section H of the nozzle 69. If desired, the inner electrode 70 may also be of a hollow design, as for the passage of a coolant, or for the introduction of a gas jet emerging from radial bores in the inner electrode 70 into the energy-rich glow discharge in the tube section H.

The gas to be ionized may also be introduced via a nozzle-type inlet 72 into a reaction chamber formed by the tube 73 as shown in FIG. 10. The anode 74 is arranged in insulated relationship within the said chamber. A further gas current can be introduced into the hollow discharge obtained in the tube section H through a separate nozzle 75.

As finally indicated in FIG. 11, the cathode and the anode may each be formed of a metal tube 76 and 77 respectively, which are connected by an insulating tube section 78. The gas is supplied to this nozzle arrangement via a bore 79, i.e. introduced into the cathode 76. When pressure and diameter conditions are suitable, an energetic hollow discharge will be obtained in the tube section H. In certain cases, the tube section 77 may be operated as the cathode, and the tube section 76 as the anode, i.e. the hollow discharge may be obtained in the tube 77.

The hollow discharge cannot occur in the sections of the nozzle duct deseginated as H in FIGS. 5a and 7 through 11 unless the product of the diameter D (in mm.) and the gas pressure P (in mm. Hg) reaches a certain value; for $H_2$ gas approx. within the range $D.P=20 \ldots 100$ mm. Hg, since the glow edges are contiguous or overlap only at such values of D.P. With other types of gas, the range of D.P is shifted; by way of example, the values must be multiplied by ½ for $N_2$ and by ⅓ for $O_2$. It is not absolutely necessary that such overlapping obtains permanently as is the case, by way of example, when the connections 10 and 11 in FIG. 5a are supplied by a direct voltage source. An alternating or impulse voltage periodically changing its polarity may be suppied. Furthermore, an intermittent direct voltage may be supplied so that hollow discharges occur intermittently in the relative zone. Also the overlaying of energy impulses of a shorter or longer duration on the normal supply voltage may be advantageous.

In the embodiments disclosed in conjunction with FIGS. 5a through 11, mainly the positive gas ions appear to be concentrated in the gas jet during its passage through the nozzle zone H having an increased discharge energy, since ions of this polarity preponderate in the hollow discharge. Accordingly the gas jet emerging from nozzle arrangements of this design possesses a great deal more positive charge carriers than negative ones.

The nozzle duct according to FIGS. 5a through 11 may be formed, at least in certain sections, of a non-magnetic metal or an insulating material and be subject to the action of an axial and/or transverse magnetic field, similar to that described in detail in conjunction with FIGS. 2 through 4. The section subject to the magnetic action may comprise all or parts of the section H having an increased discharge energy, but it may also be located downstream of the section H.

The embodiments described above of devices for the performance of the present method are designed to concentrate charge carriers of only one polarity in a gas jet during its passage through a nozzle-type member. Below, embodiments are described in which the gas jet is enriched with a desired type of charge carriers as it emerges from a nozzle or subsequently thereto.

There are a number of embodiments for devices of this kind in which a gas jet having a higher pressure enters a space with a lower pressure and therein forms a defined zone of higher pressure which is entirely or partly subject to the action of an electric field. This electric field causes an electric gas or glow discharge to take place in the zone of increased pressure, which discharge in turn causes ionization of the gas jet. The metallic nozzle is preferably operated as the cathode and a counterelectrode arranged in front thereof, or the metallic walls of the receptacle are employed as the anode. As already stated in the said patent, a nozzle insulated from the voltage sources or itself formed of an insulating material may be employed as well, and the gas jet 1 conducted through a discharge gap formed between separate electrods. Where pressure conditions are suitable, the metallic nozzle may be operated as the anode, and a separate cathode located in the gas jet.

Experience has shown that positive gas ions are preferably produced in the ionization of the gas jet freely emerging from the nozzle by a gas or glow discharge so that the positive ions are concentrated in the said gas jet. Tests have disclosed that 60 to 90 percent of all charge carriers are positive.

It may be pointed out that the zone of increased pressure formed is created in front of the nozzle mouth. Accordingly, where the metallic nozzle operates as the cathode, the ionizing discharge zone may extend as far as the nozzle mouth and, under certain pressure conditions, into the nozzle duct. A discharge occurs in which a hollow discharge is obtained within the nozzle duct according to the type described in conjunction with FIGS. 5 through 11, and, on the other hand, a gas or glow discharge in the zone of a pressure greater than around it extending outside the nozzle. This interaction of the two types of discharge produces a particularly intense concentration of mainly positive charge carriers in the gas jet.

In the concentration of charge carriers of a single polarity in a gas jet by the means disclosed in the said patent, it has proved advantageous not to leave the ionized gas jet to itself but to guide it. In particular it may be desirable with strong exothermal reactions in the gas jet that the ionized gas jet remains within a space portion located in axially symmetrical relationship to the jet axis. This is possible by exerting a magnetic influence on the ionized gas jet.

An embodiment for the magnetic focusing of a gas jet with a concentration of ions of a single polarity is shown diagrammatically in FIG. 12, in which the nozzle is indicated at 80 and the gas jet emerging from it at 81. The means disclosed in the said patent ionize the gas jet from the plane 82 normal to the jet axis, which is indicated by hatching. Arranged coaxially along the jet axis is the lens 83 shown in longitudinal section, which consists of a U-shaped iron ring 84 and a coil 85 provided therein. If the coil 85 is energized via the connections 86 and 87 with direct current, a magnetic field is set up in the central plane of the lens 83 normal to the jet axis, which is parallel with the jet axis and extends normally through this central plane. Under the action of this magnetic field, the gas ions moving obliquely relative to the jet axis are deflected towards the said axis so that the portion of the gas jet with the ions of a single polarity concentrates in a focus 88 on the jet axis. Naturally the magnetic lens 83 cannot act upon non-ionized gas particles, which continue their divergent travel indicated by line 89 without being influenced. The sharp focusing of the ionized gas jet diagrammatically shown in FIG. 12 can be obtained only if charge carriers of the same charge and the same mass are present. If their mass is different, several focusing points along the jet axis will be obtained for charge carriers having the same polarity but a different ratio between charge and mass.

Instead of focusing by magnetic lens systems, magnetic bunching may be obtained, as shown in FIG. 13, by a transverse field of the magnet 90, in which the magnetic field is located between the poles 91, 92 normal to the jet axis and parallel with the drawing plane in FIG. 13. In such a magnetic field the charge carriers in the gas jet 81 describe spiral paths of which the diameter can be kept so small by a sufficiently strong magnetic field that the gas jet or the ionized portion thereof forms approximately a cylinder which is coaxial with the jet axis. When performing heavily exothermal transformation reactions with such a gas jet having ions of a single polarity, the proper dosage of the gas volume employed for the reaction is essential so that the process can be kept under control. The present method enables the dosage to be effected in a simple manner in that the diameter of the bore in the nozzle head 80 is dimensioned accordingly.

By way of example, a bore of 1 sq. mm. opening will produce a gas jet of roughly 1 cu. cm. per second at a pressure of the gas jet supplied of about 1 gauge atmosphere and an inner pressure in the receptacle of about 10 mm. Hg. However, it is also possible to ionize the gas jet emerging from the nozzle to a greater or lesser degree, and to influence the ionized portion magnetically so that a separation of the ionized gas jet from the non-ionized jet is obtained. By way of example, the reaction desired can be performed with the ionized gas jet alone so that a very accurate dosage of the gas volume supplied to the reaction space can be effected by a corresponding setting of the degree of ionization.

In the performance of the reactions under the method according to the main patent, ionized reaction products often occur which may differ in respect of the polarity of their charges as well as in respect of the ratio between charge and mass. Magnetic action exerted on the gas jet carrying the reaction products in such cases enables the separation of ionized reaction products from the gas jet. Such ionized components may be deflected relative to the gas jet axis, or they may be more strongly bunched or focused. The concentration of such ionized reaction products at predetermined locations in the interior of the receptacle then facilitates their separate removal.

As stated above, the zone in which the gas stream is intensely ionized may extend into the nozzle bore when pressure is increased and if the said bore is of sufficient width. It may be advantageous in such cases, as shown in FIGS. 14 and 15, to form the nozzle 95 of a non-magnetic material and to arrange it within the range of a magnetic longitudinal field of the magnetic lens 96 and, respectively, of a magnetic transverse field of the magnets 97, 98. On the one hand, the energy transformation in the gas jet has thereby been increased, and, on the other hand, the bunching of the said jet could be improved. Furthermore, reaction products of different ionization can be separated directionally already in the gas jet emerging from the nozzle 95.

The magnetic fields parallel with or transverse to the axis of the gas jet may be obtained by sufficiently powerful permanent magnets or by electromagnets properly energized. The electromagnets are preferably supplied with direct voltage of a constant or pulsatingly variable intensity.

Magnetic influencing of the ionized gas jet may also be effected by spark discharges of a high current intensity. In particular, a spark discharge along the axis of the gas jet will product a constriction of the ionized gas jet in the radial direction owing to the magnetic field interlinked with the flow of current.

The very high density of ions in certain space portions obtained by magnetic concentration of the gas jet having ions of one polarity causes the conductivity in the said space portions to be correspondingly increased. By way of example, this applies to the immediate vicinity of the focusing point 88 in FIG. 12 and of the gas jet within the transverse magnetic field in FIG. 13. Since the zone with the elevated pressure within the gas jet 81 forms part of the discharge gap for the gas and glow discharge from the nozzle 80 to this space portion if the nozzle 80 is at least partly metallic and operates as an electrode, this discharge displays the tendency to shift in the direction towards this portion of increased conductivity. This effect, which appears to be caused by the reduction in the resistance of the discharge gap in the range of higher ion concentration, causes the nozzle mouth to be relieved in respect of enregy in favor of an increase of the energy transformation in the zone of elevated pressure in the gas jet and in the space portion having a higher concentration of ions.

The nozzle may be further relieved by intensive cooling since this appears to increase the resistance of the discharge gap in its imemdiate vicinity. This raises the tendency of the gas or glow discharge to shift, in respect of energy, to the above-mentioned portions having a lower discharge gap resistance.

Both measures cause the energy to be increased, i.e. the ion supply to the magnetic focusing space portion to be increased, so that the ion density is further increased. In particular, it is advantageous that practically all ions present in this space portion have a single polarity, preferably a positive polarity. In this manner, very high ion densities corresponding to an electric current intensity of from $10^5$ to $10^9$ A. may be obtained. The discharge occurring in the gas jet having ions of a single polarity and in the space portion having a higher ion density remains stable.

Naturally the powerful discharge described which has a high density of ions in the gas jet with ions of a single polarity can be obtained only via a so-called starting process. By way of example, a weak gas or glow discharge is created in the vicinity of the nozzle mouth, and a correspondingly low gas pressure applied. After obtaining a zone of elevated pressure by introducing a gas jet which is initially weak, an increase in the voltage, in the presure in the vicinity of the gas jet and in the pressure of the nozzle enables an ever more energetic discharge to be obtained and the concentration of ions having a single polarity in the gas jet be increased. The power for the magnetic field must be sufficient to cause a concentration of the gas ions in the space portion selected. Upon further increasing the electrical energy supplied and of the gas pressure within and/or outside the nozzle, the energy in the magnetically focused space portion may be raised. It is advantageous to operate the nozzle without cooling at the outset of the starting process, and to apply more or less cooling to the nozzle after reaching a higher degree of energy transformation.

The disclosed method of obtaining a very high density of charge carriers within a gas jet is also suitable for application to nuclear transformation, by way of example in the device according to FIGS. 16 and 17.

The arrangement shown in the basic diagram according to FIG. 16 here comprises a container 100 of spherical configuration which is connected, via an outlet channel 101, with a suitable heat exchanger (not shown) and a pump unit (not shown). Opposite the mouth of the outlet channel 101 a jet nozzle 102 is attached to the wall of the container 100, the said nozzle consisting of an electrically insulating jacket 103, the metallic supply tube 104 and the nozzle head 105 proper. If desired, the wall of the nozzle head 105 and of the supply tube 104 may be hollow and designed to circulate a coolant.

Projecting into the container 100 normally to the central axis of the nozzle 102 and radially towards the centre of the spherical container 100 are the two electrode lead-ins 106 and 107. The electrode points 108 and 109 are spaced by a predetermined, possibly adjustable, distance. The insulating sleeves 110 and 111 seal the lead-ins 106 and 107 relative to the container wall. The electrode lead-in 107 is grounded outside the container 100, while the electrode lead-in 106 may be connected to the condenser 113 via switching member 112, the said condenser 113 being charged by the direct voltage source 115 via the preresistor 114.

If a gas stream is blown into the container 100 through nozzle 102 under such overpressure relative to the pressure in the interior of the container, that a gas jet forms behind the nozzle head 105, a zone of pressure higher than the pressure in the interior of the container is formed as indicated by the broken lines 116. The gas jet which is axially symmetrical with the nozzle axis if the nozzle mouth is circular, forms a well-defined gas column which extends over a certain length from the nozzle mouth along the axis, the axial core area forming an elongated zone of higher pressure.

A nozzle arrangement so operated will therefore provide a gas jet which is free of closely adjacent walls. The distance between the said gas jet 116 and the wall of the container 110 is optional and should amount to a multiple of the diameter of the gas jet. If a highly exothermic transformation reaction is initiated or performed within the zone forming the gas jet and having a higher pressure relative to the pressure in the interior of the container and high temperatures arising in the said reaction, there will be no danger of overheating the container walls. On the one hand, the heat conduction from the gas jet in the direction normal to the jet axis is relatively slight, particularly if a pressure within atmospheric pressure, as below 100 mm. Hg, is maintained in the interior of the container. On the other hand, the radiation losses in the arrangement according to FIG. 16 are substantially reduced by the spherical design of the container 100 since the heat radiation impinging on the inner wall of the container 100 is at least partly reflected back into the interior. This reflexion effect is particularly noticeable when the exothermic transformation reaction is initiated in the portion of the gas jet 116 adjacent the centre of the spherical container 100 since the reflected radiation is focused on this reaction zone.

An arrangement according to FIG. 16 may, by way of example, be employed for the thermonuclear transformation of hydrogen or deuterium, or of a mixture of these two gases, into helium. For this purpose, the zone of the gas jet located in the centre of the spherical container 100 is electrically stimulated, by way of example, using a high-intensity spark discharge produced between the electrode points 108 and 109, by discharging the condenser 113 charged to e.g. 50,000 volts by closing the switching member 112 via the lead-in 106, the spark gap between the electrode points 108, 109 and the lead-in 107. If the condenser and the spark gap are designed so as to be of sufficiently low inductance, high current densities of up to $10^5$ and $10^6$ amp. can be obtained which result in an extremely high degree of ionization of the zone of the gas jet 116 for the initiation of thermonuclear reactions. While the problems of producing sufficiently heat-resistant walls and the reduction of energy losses by heat conduction have so far appeared insoluble with the known attempts at performing thermonuclear reactions in a gas column by means of electric spark discharges, these problems have been substantially simplified by the present method because the walls can be sufficiently spaced from the gas jet and the energy losses greatly reduced. If the walls of the spherical container 100 are additionally cooled, as by a coolant stream, which is supplied to and drained from the space 117 between the wall of the container 100 and an outer cooling jacket 118 via the connections 119 and 120 respectively, very high energies can be transformed in the jet zone at the centre of the interior without subjecting the container walls to excessive heating.

The present method of performing exothermic transformation reactions in a portion of the gas jet is of particular advantage also because the removal and utilization of the energy thereby released is possible without undue difficulties. As shown by the arrangement according to FIG. 16, it is possible to provide an outlet channel 101 of large cross-section of which the walls are cooled as well. Furthermore, a cold additional gas may be blown into this outlet channel through one or several suitable supply members 121, the hot gas stream of the gas jet 116 mixing with the former to form a gas stream of lower temperature which may then be supplied to a heat exchanger, a steam generator or some other type of thermal consuming unit. The cold gas may also be replaced by a liquid or a finely dispersed material which is then directly evaporated by the hot gas stream. It is evident that many possibilities of controlling and utilizing the hot gas stream are available.

Instead of stimulating the gas jet 116 by means of a spark discharge set up transversely to the jet axis, a spark discharge directed substantially parallel with the jet axis may be employed by arranging coaxially with the jet axis on either side of the centre of the container an annular electrode 125 according to FIG. 17 between which the spark discharge is set up. The annular electrodes may be formed of a metal tube 126 bent to form a ring which is held by one or several supply tubes 127 so that the interior of the tube 128 may be utilized for cooling, e.g. by means of a liquid stream. If desired, the spark discharge may also be obtained between an annular electrode so disposed and the metallic nozzle head 105.

It is again possible to effect electric stimulation of the gas jet for the initiation and/or maintenance of a transformation reaction by means of other discharges of sufficient energy density, by way of example by means of high-intensity gas or glow discharges obtained between two annular electrodes 125 according to FIG. 17 arranged coaxially to the jet axis, or such an annular electrode 125 and the metallic nozzle head 105. Such gas or glow discharges may have additional energy impulses or spark discharges superposed both in parallel and in transverse relationship to the gas jet axis.

In highly exothermic transformation reactions in a gas jet, the gas must remain, as far as possible, within a predetermined spatial area; an arrangement according to FIG. 16 has a conical chamber axially symmetrical with the jet axis and indicated by the boundary lines 122. In order to obtain this condition, it is advantageous magnetically to influence the gas stream, which is highly ionized by electric stimulation as described above in conjunction with FIGS. 12 and 13.

In the performance of highly exothermic transformation reactions, the proper dosage of the gas volume designed for the reaction is of the greatest importance for the process to be kept under control. The present method enables such dosage to be readily effected by dimensioning the diameter of the bore in the nozzle head 105 accordingly. By way of example, a bore of about 1 sq. mm. inside opening, with a pressure of the gas stream supplied of approx. 1 gauge atmosphere and a pressure in the interior of the container of about 10 mm. Hg, will produce a gas stream of roughly 1 cu. cm. per second. However, it is also possible to obtain a higher or lesser degree of ionization in the gas jet issuing from the nozzle and to influence the ionized portion magnetically, to separate it from the non-ionized gas stream as described above and to perform the transformation reaction only with the gas ions; this enables the reacting gas volume to be additionally dosed and, in particular, very small gas volumes to be cut out.

In the arrangement according to FIG. 16 only one nozzle 102 is provided to supply a single gas jet 116. However, it is also possible to provide several such nozzles of which the gas jets converge on a predetermined area of the interior, preferably on the centre of the spherical container 100. The gas jets may consist of one and the same gas or gas mixture or supply different gases to the interior of the container. The interior of the container may further be filled with a protective gas supplied through separate supply members, and kept at a predetermined gas pressure. While it is advantageous, in view of the reduction of the heat conduction losses, to select a pressure in the interior of the container smaller than atmospheric pressure, higher interior pressures may be employed if the gas jet itself has a sufficient overpressure relative to the interior.

The performance of the present method is naturally not limited to the arrangement shown in FIG. 16. The spherical container may be replaced by a cylindrical drum of which the central axis coincides with the jet axis, which is provided, at one of its ends, with one or several nozzles for the supply of a gas jet, and of which the other end passes over into the outlet channel.

I claim:

1. An apparatus for performing metallurgical and chemical processes under the action of gas ions comprising two reaction chambers separated by a nozzle-type member having an aperture therein; means to introduce gas under pressure into said first chamber at a point removed from said nozzle-type member whereby a stream of gas is formed which flows through said first chamber and said nozzle-type member into said second chamber; first and second electrically conductive members located upstream from said nozzle-type member and each having a surface exposed in said first chamber, said electrically conductive members being spaced apart and insulated from each other and connected to oppose poles of a source of potential to produce a glow discharge therebetween whereby said gas passing into said second chamber is ionized and concentrated with ions of a single polarity before issuing into said second chamber, said first electrically conductive member being a plate which forms one end of said first reaction chamber, said second electrically conductive member is a sleeve forming the lateral walls of said first chamber and said gas is introduced into said first chamber through an opening in said first electrically conductive member.

2. An apparatus as claimed in claim 1 wherein said nozzle-type member is located at the end of said chamber opposite to said first electrically conductive member.

3. An apparatus as claimed in claim 2 wherein said sleeve is connected to the negative pole of said source of potential whereby said gas passing into said second chamber is concentrated with respect to positive ions.

4. An apparatus for performing metallurgical and chemical processes under the action of gas ions comprising two reaction chambers separated by a nozzle plate having an aperture therein, said first reaction chamber being cylindrical in shape and having one end formed by said nozzle plate, the opposite end formed by an electrically conductive plate having an opening therein and the lateral walls formed by an electrically conductive sleeve which is spaced apart and insulated from said electrically conductive plate; means to introduce gas under pressure through said opening in said electrically conductive plate whereby a stream of gas is formed which flows through said first chamber and said aperture of said nozzle plate into said second chamber and a source of potential, the opposite poles of which are connected to said electrically conductive sleeve and said electrically conductive plate to produce a glow discharge therebetween whereby said gas passing into said second chamber is ionized and concentrated with ions of a single polarity before issuing into said second chamber.

5. An apparatus as claimed in claim 4 including magnetic means to control the path of said ionized gas.

References Cited
UNITED STATES PATENTS

| | | | |
|---|---|---|---|
| 933,094 | 9/1909 | Moscicki | 204—311 |
| 2,583,898 | 1/1952 | Smith | 204—312 |
| 2,940,011 | 6/1960 | Kolb | 204—156 |
| 3,005,762 | 10/1961 | Fenn | 204—312 |

JOHN H. MACK, *Primary Examiner.*

H. S. WILLIAMS, *Assistant Examiner.*